United States Patent Office

3,004,942
Patented Oct. 17, 1961

3,004,942
PROCESS OF INCREASING THE PARTICLE SIZE OF SYNTHETIC LATEX BY TREATMENT WITH POLYVINYL ALCOHOL AND VOLATILE ELECTROLYTE
Robert W. Brown, Naugatuck, Conn., assignor to United States Rubber Company, New York, N.Y., a corporation of New Jersey
No Drawing. Filed Nov. 28, 1958, Ser. No. 776,763
13 Claims. (Cl. 260—29.7)

This invention relates to increasing the particle size of synthetic rubber latices, and particularly to permit them to be concentrated to fluid latices of high solids content.

The use of electrolytes to cause an increase in the particle size of synthetic rubber latices is well known. The addition to a synthetic rubber latex of a volatile electrolyte that can be removed from the latex by distillation to increase the particle size of the latex is known as shown in Rumbold U.S. Patent No. 2,475,053, granted July 5, 1949.

I have found that the increase in the particle size of a synthetic rubber latex by the addition of a volatile electrolyte such as ammonium bicarbonate or ammonium carbonate is much greater if polyvinyl alcohol is also added to the latex. Latices to which such volatile electrolyte and polyvinyl alcohol have been added may readily be concentrated, preferably by evaporation concentration which also volatilizes the volatile electrolyte, to fluid high solids latices.

In carrying out the present invention, there is added to a synthetic rubber latex 2% to 15% of ammonium bicarbonate or ammonium carbonate and also 0.03% to 1% of polyvinyl alcohol, based on the weight of the solids of the latex. The latex will conventionally have a solids content of 25% to 50%, and after the addition of the ammonium bicarbonate or carbonate and the polyvinyl alcohol, the latex may readily be concentrated to a solids content of 55% to 70%, giving a fluid high solids latex. The latex may be concentrated by increasing the solids content in known manner as by creaming with a vegetable mucilage, such as ammonium alginate. It is preferred, however, to increase the solids content by evaporation concentration which also volatilizes the added ammonium bicarbonate or carbonate.

Polyvinyl alcohols are generally graded by the viscosity in centipoises of a 4% solution of the polyvinyl alcohol in water at 20° C. Any of the conventional polyvinyl alcohols having a viscosity in 4% aqueous solution at 20° C. from 4 to 70 centipoises may be used in the present invention. An example of a commercial low viscosity type polyvinyl alcohol is one having a viscosity of 4 to 6 centipoises in 4% aqueous solution at 20° C. An example of a commercial medium viscosity type polyvinyl alcohol is one having a viscosity of 20 to 30 centipoises in 4% aqueous solution at 20° C. An example of a commercial high viscosity type polyvinyl alcohol is one having a viscosity of 45 to 70 centipoises in 4% aqueous solution at 20° C.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ether; methyl vinyl ketone; vinylidene chloride. Such a synthetic rubber latex may be termed a "butadiene polymer synthetic rubber latex." The latices will contain dispersing agents from the polymerization generally in amount from 2% to 10% by weight of the solids of the latex of one or a mixture of anionic surface-active dispersing agents. Such anionic surface-active dispersing agents may be water-soluble soaps of soap-forming monocarboxylic acids, such as alkali-metal, ammonium or amine salts of higher fatty acids having 10 to 24 carbon atoms in the molecule or of rosin acids, including hydrogenerated, dehydrogenated and disproportionated rosin acids. The anionic surface-active dispersing agents may be sulfonated or sulfated compounds having the general formula $R—SO_3M$ or $R—OSO_3M$, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde. Additional such surface-active dispersing agents in amount up to 3% of the solids of the latex may be added to the latex before increasing the particle size according to the present invention to assure stability to the latex on particle size enlargement, and on concentrating the latex. Non-volatile electrolytes may be present in the synthetic rubber latex from the polymerization recipe, and may be added together with the volatile electrolyte according to the present invention; generally not more than 0.5% based on the latex solids of such non-volatile electrolyte will be added.

The following examples illustrate the invention. All parts and percentages referred to herein are by weight.

*Example 1*

To 100 gm. samples (30 gm. of solids) of a 30% solids content latex of a synthetic rubber copolymer of 70 parts of butadiene-1,3 and 30 parts of styrene containing 3.6 parts of potassium laurate soap emulsifying agent based on 100 parts of latex solids were added 2 parts per 100 parts of latex solids of a commercial dispersing agent which was the condensation product of sodium naphthalene sulfonate and formaldehyde as a 20% aqueous solution. Sample A was not otherwise compounded. To samples B and C were added 2 and 4 parts respectively per 100 parts of latex solids of ammonium carbonate $(NH_4)_2CO_3$ as a 20% aqueous solution. To samples D, E and F were added 0.2 part of polyvinyl alcohol (PVA) per 100 parts of latex solids as a 10% aqueous solution at 25° C., and to samples E and F were also added 2 and 4 parts respectively per 100 parts of latex solids of ammonium carbonate as a 20% aqueous solution. The polyvinyl alcohol was a low viscosity type having a viscosity of 4 to 6 centipoises in 4% aqueous solution at 4° C. The thus treated samples A to F were heated for one hour at 50° C. after which measurements were made of the average particle size of the latices. The results are shown in the table below:

| Sample | $(NH_4)_2CO_3$ (Parts) | PVA (Parts) | Ave. Particle Diameter (Angstrom Units) |
|---|---|---|---|
| A | 0.0 | 0.0 | 550 |
| B | 2.0 | 0.0 | 550 |
| C | 4.0 | 0.0 | 700 |
| D | 0.0 | 0.2 | 570 |
| E | 2.0 | 0.2 | 1,050 |
| F | 4.0 | 0.2 | 2,200 |

It may be seen from the above table that the ammonium carbonate alone and the polyvinyl alcohol alone had little if any effect on the particle size of the latex whereas the ammonium carbonate and the polyvinyl alcohol greatly increased the average particle diameter.

*Example 2*

A latex of a synthetic rubber copolymer of 35 parts of butadiene-1,3 and 65 parts of styrene polymerized with 5% based on the butadiene and styrene of sodium alkyl benzene sulfonate emulsifying agent in which the alkyl group contained 12 to 18 carbon atoms and having an average particle diameter of about 700 Angstrom units was used in this example. To 100 gm. samples of the latex were added ammonium carbonate, or polyvinyl alcohol (PVA), or both, in amounts (parts per 100 parts of latex solids) shown in the table below. The ammonium carbonate $(NH_4)_2CO_3$ was added to the latex as a 20% solution. The polyvinyl alcohol was a low viscosity type having a viscosity in 4% aqueous solution at 20° C. of 4 to 6 centipoises, and was added to the latex as a 10% aqueous solution at 25° C. The samples were rotated overnight at 50° C., after which measurements were made of the average particle size of the latices. The results are shown in the table below:

| $(NH_4)_2CO_3$ (Parts) | PVA (Parts) | Ave. Particle Diameter (Angstrom Units) |
|---|---|---|
| 0.0 | 0.1 | 850 |
| 5.0 | 0.0 | 1,700 |
| 5.0 | 0.1 | 2,100 |
| 5.0 | 0.2 | 2,350 |
| 5.0 | 0.4 | 2,400 |

It may be seen from the above table that the polyvinyl alcohol by itself caused very little increase in particle size and that it appreciably increased the particle size enlargement caused by the ammonium carbonate.

*Example 3*

To 1000 gm. portions (300 gm. of solids) of a 30% solids content latex of a synthetic rubber copolymer of 70 parts of butadiene-1,3 and 30 parts of styrene containing 4.7 parts of potassium oleate soap emulsifying agent were added 2 parts per 100 parts of latex solids of a commercial dispersing agent which was the condensation product of sodium naphthalene sulfonate and formaldehyde as a 20% aqueous solution. The original latex became extremely viscous if concentrated above 40% solids content by concentration evaporation. The various portions were compounded with ammonium carbonate $(NH_4)_2CO_3$ or ammonium bicarbonate $NH_4HCO_3$ in some case with additional nonvolatile electrolyte (potassium and sodium carbonates), and with polyvinyl alcohol in amounts (parts per 100 parts of latex solids) as shown in the table below. The carbonates or mixtures of carbonates were added as 20% aqueous solutions. The polyvinyl alcohol was a low viscosity type having a viscosity in 4% aqueous solution at 20° C. of 4 to 6 centipoises, and was added to the latex portions as a 10% aqueous solution at 25° C. The latex portions after compounding were held for one-half hour at room temperature, heated to 50° C. to 60° C. for about ten minutes, and then concentrated by evaporation concentration in laboratory disc concentrator which served the dual purpose of evaporating off the volatile electrolyte and increasing the solids content of the latex. The solids contents and viscosities of the concentrates from the various treated latex portions are given in the table below:

| Parts of Volatile Electrolyte Added | Parts of Non-Volatile Electrolyte Added | Parts of PVA Added | Solids (percent) of Concentrate | Viscosity (Centipoises) of Concentrate |
|---|---|---|---|---|
| $5(NH_4)_2CO_3$ | None | 0.1 | 58.5 | 5,900 |
| $5NH_4HCO_3$ | None | 0.1 | 64.5 | 2,800 |
| $4.83(NH_4)_2CO_3$ | $0.17K_2CO_3$ | 0.1 | 59.8 | 315 |
| $4.67(NH_4)_2CO_3$ | $0.33K_2CO_3$ | 0.1 | 63.0 | 310 |
| $4.83(NH_4)_2CO_3$ | $0.17Na_2CO_3$ | 0.1 | 61.3 | 360 |
| $4.67(NH_4)_2CO_3$ | $0.33Na_2CO_3$ | 0.1 | 68.3 | 1,300 |
| $5(NH_4)_2CO_3$ | None | 0.2 | 67.3 | 1,060 |
| $5(NH_4)_2CO_3$ | None | 0.05 | 62.9 | 260 |

The above shows the fluid properties of high solids latex concentrates prepared according to the present invention.

The viscosity measurements of the latices in the above examples were made at approximately 25° C.

The temperature of treatment of the latex according to the present invention will generally be in the range from 0° C. to 100° C. The average particle diameter of latices to be treated according to the present invention may be from 500 to 1500 Angstrom units, and the average particle diameter of these latices may be increased by 200 to 2500 Angstrom units by the process of the present invention.

The latices of increased particle size according to the present invention, particularly of high solids content, may be used in the usual applications of latices, as in foam sponge manufacture, tire cord dipping, bonding and impregnating various materials, preparation of adhesives, and the like.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 which comprises adding to the latex 2% to 15% of an ammonium salt of carbonic acid and 0.03% to 1% of polyvinyl alcohol, said polyvinyl alcohol having a viscosity in 4% aqueous solution at 20° C. from 4 to 70 centipoises, said percentages being based on the weight of the solids of the latex.

2. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 which comprises adding to the latex 2% to 15% of ammonium bicarbonate and 0.03% to 1% of polyvinyl alcohol, said polyvinyl alcohol having a viscosity in 4% aqueous solution at 20° C. from .4 to 70 centipoises, said percentages being based on the weight of the solids of the latex.

3. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 which comprises adding to the latex 2% to 15% of ammonium carbonate and 0.03% to 1% of polyvinyl alcohol, said polyvinyl alcohol having a viscosity in 4% aqueous solution at 20° C. from 4 to 70 centipoises, said percentages being based on the weight of the solids of the latex.

4. The method of increasing the size of the dispersed polymer particles in a synthetic rubber latex of a copolymer of butadiene-1,3 and styrene which comprises adding to the latex 2% to 15% of an ammonium salt of carbonic acid and 0.03% to 1% of polyvinyl alcohol, said polyvinyl alcohol having a viscosity in 4% aqueous solution at 20° C. from 4 to 70 centipoises, said percentages being based on the weight of the solids of the latex.

5. The method of increasing the size of the dispersed polymer particles in a synthetic rubber latex of a copolymer of butadiene-1,3 and styrene which comprises adding to the latex 2% to 15% of ammonium bicarbonate and 0.03% to 1% of polyvinyl alcohol, said polyvinyl alcohol having a viscosity in 4% aqueous solution at 20° C. from 4 to 70 centipoises, said percentages being based on the weight of the solids of the latex.

6. The method of increasing the size of the dispersed polymer particles in a synthetic rubber latex of a copolymer of butadiene-1,3 and styrene which comprises adding to the latex 2% to 15% of ammonium carbonate and 0.03% to 1% of polyvinyl alcohol, said polyvinyl alcohol having a viscosity in 4% aqueous solution at 20° C. from 4 to 70 centipoises, said percentages being based on the weight of the solids of the latex.

7. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 25% to 50% which comprises adding to the latex 2% to 15% of an ammonium salt of carbonic acid and 0.03% to 1% of polyvinyl alcohol, said polyvinyl alcohol having a viscosity in 4% aqueous solution at 20° C. from 4 to 70 centipoises, said percentages being based on the weight of the solids of the latex, and then increasing the solids content of the latex to within the range of 55% to 70%.

8. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 25% to 50% which comprises adding to the latex 2% to 15% of an ammonium salt of carbonic acid and 0.03% to 1% of polyvinyl alcohol, said polyvinyl alcohol having a viscosity in 4% aqueous solution at 20° C. from 4 to 70 centipoises, said percentages being based on the weight of the solids of the latex, and then distilling the ammonium salts of carbonic acid from the latex and evaporating water from the latex until the latex is concentrated to a solids content of 55% to 70%.

9. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 25% to 50% which comprises adding to the latex 2% to 15% of ammonium bicarbonate and 0.03% to 1% of polyvinyl alcohol, said polyvinyl alcohol having a viscosity in 4% aqueous solution at 20° C. from 4 to 70 centipoises, said percentages being based on the weight of the solids of the latex, and then distilling the ammonium bicarbonate from the latex and evaporating water from the latex until the latex is concentrated to a solids content of 55% to 70%.

10. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 25% to 50% which comprises adding to the latex 2% to 15% of ammonium carbonate and 0.03% to 1% of polyvinyl alcohol, said polyvinyl alcohol having a viscosity in 4% aqueous solution at 20° C. from 4 to 70 centipoises, said percentages being based on the weight of the solids of the latex, and then distilling the ammonium carbonate from the latex and evaporating water from the latex until the latex is concentrated to a solids content of 55% to 70%.

11. The method of concentrating a synthetic rubber latex of a copolymer of butadiene-1,3 and styrene having a solids content of 25% to 50% which comprises adding to the latex 2% to 15% of an ammonium salt of carbonic acid and 0.03% to 1% of polyvinyl alcohol, said polyvinyl alcohol having a viscosity in 4% aqueous solution at 20° C. from 4 to 70 centipoises, said percentages being based on the weight of the solids of the latex, and then distilling the ammonium salt of carbonic acid from the latex and evaporating water from the latex until the latex is concentrated to a solids content of 55% to 70%.

12. The method of concentrating a synthetic rubber latex of a copolymer of butadiene-1,3 and styrene having a solids content of 25% to 50% which comprises adding to the latex 2% to 15% of ammonium bicarbonate and 0.03% to 1% of polyvinyl alcohol, said polyvinyl alcohol having a viscosity in 4% aqueous solution at 20° C. from 4 to 70 centipoises, said percentages being based on the weight of the solids of the latex, and then distilling the ammonium bicarbonate from the latex and evaporating water from the latex until the latex is concentrated to a solids content of 55% to 70%.

13. The method of concentrating a synthetic rubber latex of a copolymer of butadiene-1,3 and styrene having a solids content of 25% to 50% which comprises adding to the latex 2% to 15% ammonium carbonate and 0.03% to 1% of polyvinyl alcohol, said polyvinyl alcohol having a viscosity in 4% aqueous solution at 20° C. from 4 to 70 centipoises, said percentages being based on the weight of the solids of the latex, and then distilling the ammonium carbonate from the latex and evaporating water from the latex until the latex is concentrated to a solids content of 55% to 70%.

References Cited in the file of this patent

UNITED STATES PATENTS

| | | |
|---|---|---|
| 2,138,073 | Schweitzer | Nov. 29, 1938 |
| 2,357,861 | Willson | Sept. 12, 1944 |
| 2,444,801 | Arundale | July 6, 1948 |
| 2,475,053 | Rumbold | July 5, 1949 |
| 2,482,237 | Berglund | Sept. 20, 1949 |
| 2,839,483 | Howland | June 17, 1958 |